United States Patent
Tedgue Beltrao et al.

(10) Patent No.: US 12,551,140 B2
(45) Date of Patent: Feb. 17, 2026

(54) SYSTEM AND METHOD FOR MITIGATION OF RANDOM BODY MOVEMENT AND INTERFERENCE EFFECTS IN RADAR-BASED VITAL SIGNS MONITORING SYSTEMS IN MEDICAL APPLICATIONS

(71) Applicants: IEE INTERNATIONAL ELECTRONICS & ENGINEERING S.A., Echternach (LU); Université du Luxembourg, Luxembourg (LU)

(72) Inventors: Gabriel Tedgue Beltrao, Belvaux (LU); Udo Schröder, Föhren (DE); Dimitri Tatarinov, Trier (DE); Wallace Alves Martins, Auzeville-Tolosane (FR); Mohammad Alaeekerahroodi, Luxembourg (LU); Bhavani Shankar Mysore Rama Rao, Luxembourg (LU)

(73) Assignees: IEE INTERNATIONAL ELECTRONICS & ENGINEERING S.A., Echternach (LU); UNIVERSITÉ DU LUXEMBOURG, Luxembourg (LU)

( * ) Notice: Subject to any disclaimer, the term of this patent is extended or adjusted under 35 U.S.C. 154(b) by 56 days.

(21) Appl. No.: 18/682,674

(22) PCT Filed: Aug. 5, 2022

(86) PCT No.: PCT/EP2022/072155
§ 371 (c)(1),
(2) Date: Feb. 9, 2024

(87) PCT Pub. No.: WO2023/016948
PCT Pub. Date: Feb. 16, 2023

(65) Prior Publication Data
US 2024/0335140 A1    Oct. 10, 2024

(30) Foreign Application Priority Data

Aug. 9, 2021 (LU) ........................................ 500519
Nov. 29, 2021 (LU) ........................................ 500923

(51) Int. Cl.
*A61B 5/11*    (2006.01)
*A61B 5/00*    (2006.01)
(Continued)

(52) U.S. Cl.
CPC .............. *A61B 5/1126* (2013.01); *A61B 5/05* (2013.01); *A61B 5/1102* (2013.01); *A61B 5/113* (2013.01); *A61B 5/6893* (2013.01); *G01S 7/356* (2021.05)

(58) Field of Classification Search
None
See application file for complete search history.

(56) References Cited

U.S. PATENT DOCUMENTS 8,814,805 B2   8/2014 Lin et al.
9,924,906 B2   3/2018 Lin et al.
(Continued)

OTHER PUBLICATIONS

Ye et al., "Blind source separation on non-contact heartbeat detection by non-negative matrix factorization algorithms". IEEE Transactions on biomedical engineering, 2020, vol. 67, No. 2 pp. 482-494. (Year: 2020).*

(Continued)

*Primary Examiner* — Yi-Shan Yang
(74) *Attorney, Agent, or Firm* — Reising Ethington P.C.

(57) ABSTRACT

A radar system for vital signs monitoring such as at least heart rate or breathing and a method for mitigating random body movement and external interference effects in vital signs monitoring such as at least heart rate or breathing by employing a radar system that is configured for providing in-phase and quadrature signals from reflected and received (Continued)

radar waves are provided. The problem of random body movement effects and external interference affecting vital signs monitoring is at least mitigated by decomposing and filtering a reconstructed displacement signal using a time and frequency analysis technique such as Short-Time Fourier Transform (STFT), followed by a Non-negative Matrix Factorization (NMF) operation. This decomposition allows the identification of time and frequency basis components containing the random body movement interference. Hence, the filtered signal can be reconstructed after removing the random body movement components, thus enabling reliable and robust vital-signs parameter estimation.

12 Claims, 6 Drawing Sheets

(51) Int. Cl.
    *A61B 5/05*     (2021.01)
    *A61B 5/113*    (2006.01)
    *G01S 7/35*     (2006.01)

(56) References Cited

U.S. PATENT DOCUMENTS

| | | |
|---|---|---|
| 10,506,981 B2 | 12/2019 | Horng et al. |
| 10,966,663 B2 | 4/2021 | Lorato et al. |
| 2016/0354038 A1 | 12/2016 | Demirtas et al. |
| 2021/0293948 A1* | 9/2021 | Peng ............... G01S 13/345 |

OTHER PUBLICATIONS

Ye et al., "Non-negative matrix factorization-based blind source separation for non-contact heartbeat detection". 2019, IEEE international conference on communications, pp. 1-6. (Year: 2019).*

Ye Chen et al Blind Source Separation on Non-Contact Heartbeat Detection by Non-Negative Matrix Factorization Algorithms IEEE Transactions on Biomedical Engineering, IEEE, USA, vol. 67, No. 2, May 8, 2019 (May 8, 2019), pp. 482-494, XP011767235, ISSN: 0018-9294, DOI: 10.1109/TBME.2019.2915762.

Ye Chen et al Non-Negative Matrix Factorization-Based Blind Source Separation for Non-Contact Heartbeat Detection ICC 2019—2019 IEEE International Conference on Communications (ICC), IEEE, May 20, 2019 (May 20, 2019), pp. 1-6, XP033582280, DOI: 10.1109 CC. 2019.8761743.

Gabriel et al Contactless radar-based breathing monitoring of premature infants in the neonatal intensive care unit Scientific reports, Mar. 25, 2022 (Mar. 25, 2022), XP055944 708, England, DOI: 10.1038/s41598-022-08836-3, URL:https://www.nature.com/articles/s41598-022-08836-3.pdf?origin=ppub.

International Search Report corresponding to application PCT/EP2022/072155, dated Sep. 30, 2022, 4 pages.

International Written Opinion corresponding to application PCT/EP2022/072155, dated Sep. 30, 2022, 7 pages.

Kebe et al, Human Vital Signs Detection Methods and Potential Using Radars: A Review, Sensors (Switzerland), vol. 20, No. 5 (2020), 1454, pp. 1-38.

Le Kernec et al., Radar Signal Processing for Sensing in Assisted Living: The Challenges Associated With Real-Time Implementation of Emerging Algorithms, in IEEE Signal Processing Magazine, vol. 36, No. 4, Jul. 2019, pp. 29-41.

Fioranelli et al., Radar for Health Care: Recognizing Human Activities and Monitoring Vital Signs, in IEEE Potentials, vol. 38, No. 4, Jul.-Aug. 2019, pp. 16-23.

Shah et al., RF Sensing Technologies for Assisted Daily Living in Healthcare: A Comprehensive Review, in IEEE Aerospace and Electronic Systems Magazine, vol. 34, No. 11, Nov. 1, 2019, pp. 26-44.

Villarroel et al., Non-contact physiological monitoring of preterm infants in the Neonatal Intensive Care Unit, npj Digit. Med. 2, 128 (2019), pp. 1-18.

Muñoz-Ferreras et al., Random Body Movement Mitigation for FMCW-Radar-Based Vital-Sign Monitoring, 2016 IEEE Topical Conference on Biomedical Wireless Technologies, Networks, and Sensing Systems (BioWireleSS), 2016, pp. 22-24.

Kim et al., , "Non-contact respiration monitoring using impulse radio ultrawideband radar in neonates", R. Soc. open sci. 6: 190149, 2019, pp. 1-11.

Lee et al., Feasibility of non-contact cardiorespiratory monitoring using impulse-radio ultra-wideband radar in the neonatal intensive care unit, PLoS One, Dec. 28, 2020;15(12), pp. 1-15.

Adib et al., Smart Homes that Monitor Breathing and Heart Rate, Proceedings of the 33rd Annual ACM Conference on Human Factors in Computing Systems (CHI '15). Association for Computing Machinery, New York, NY, USA, 2015, pp. 837-846.

Lv et al., Doppler Vital Signs Detection in the Presence of Large-Scale Random Body Movements,Transactions on Microwave Theory and Techniques, vol. 66, No. 9, Sep. 2018, pp. 4261-4270.

* cited by examiner

SYSTEM AND METHOD FOR MITIGATION OF RANDOM BODY MOVEMENT AND INTERFERENCE EFFECTS IN RADAR-BASED VITAL SIGNS MONITORING SYSTEMS IN MEDICAL APPLICATIONS

TECHNICAL FIELD

The invention generally relates to radar-based vital signs monitoring systems in medical applications such as patient care, contactless vital signs monitoring, clinical and ambulant patient monitoring, telemedicine (remote diagnostic), and a method for mitigating random body movement effects and external interference in vital signs monitoring such as at least blood oxygen saturation, heart rate or breathing by a radar system.

Moreover, the invention is also intended for use in automotive applications to medically support future radar based, automotive in-cabin driver or occupant monitoring systems with regard to breathing and heartbeat monitoring. Further, it is conceived within the scope of this invention to use the radar-based vital signs monitoring system for supporting assisted living and for security purposes, for instance at airports.

BACKGROUND

In the field of monitoring cardiorespiratory activity of a subject it is known to employ non-contact monitoring methods which provide several advantages over standard cable-connected devices. Non-contact monitoring neither confines nor inhibits the subject, and does not cause any discomfort, skin damage or irritation as electrodes, adhesive sensors or straps could do [M. Kebe, R. Gadhafi, B. Mohammad, M. Sanduleanu, H. Saleh, and M. Al-Qutayri, "*Human Vital Signs Detection Methods and Potential Using Radars: A Review*", Sensors (Switzerland), vol. 20, no. 5 (2020), 1454, https://doi.org/10.3390/s20051454].

In this context, radar devices have been proven to be a promising technology for contactless vital-signs detection and estimation, with several applications that have been proposed recently [J. Le Kernec et al., "*Radar Signal Processing for Sensing in Assisted Living: The Challenges Associated With Real-Time Implementation of Emerging Algorithms*", in IEEE Signal Processing Magazine, vol. 36, no. 4, pp. 29-41, July 2019, doi: 10.1109/MSP.2019.2903715; F. Fioranelli, J. Le Kernec and S. A. Shah, "*Radar for Health Care: Recognizing Human Activities and Monitoring Vital Signs*", in IEEE Potentials, vol. 38, no. 4, pp. 16-23, July-August 2019, doi: 10.1109/MPOT.2019.2906977; S. A. Shah and F. Fioranelli, "*RF Sensing Technologies for Assisted Daily Living in Healthcare: A Comprehensive Review*", in IEEE Aerospace and Electronic Systems Magazine, vol. 34, no. 11, pp. 26-44, 1 Nov. 2019, doi: 10.1109/MAES.2019.2933971].

The activity of the cardiovascular and respiratory systems causes some physical and physiological effects on the human body. Volumetric changes of the heart muscle while pumping blood through the circulatory system can be transmitted to the chest, leading to a subtle movement of the skin. The chest also moves during the inspiration/expiration cycle as a result of the diaphragm movement. These small and periodic movements can be detected by an appropriate radar device, allowing accurate estimation of breathing and heartbeat rates under certain conditions. Besides intrinsic characteristics of low-power consumption, low-cost, and high sensitivity, radar signals also have additional advantages, including the ability to penetrate through different materials (such as clothing, mattresses, covers and blankets), and not being affected by difference in skin pigmentation or ambient light levels [Villarroel, M., Chaichulee, S., Jorge, J. et al., "*Non-contact physiological monitoring of preterm infants in the Neonatal Intensive Care Unit*", npj Digit. Med. 2, 128 (2019), https://doi.org/10.1038/s41746-019-0199-5].

A known problem with sensing a movement of the surface of a subject by radar, referred to as a null detection point problem, is the occurrence of periodic nulls in the sensing field. The problem describes the possibility that the movement of the subject could possibly not be detected depending on the distance between the subject and the radar antennas.

As a solution, U.S. Pat. No. 8,814,805 B2 describes a method for recovering a detected signal in non-contact vital signs detection. A detected reflected signal from a non-contact vital signs detection system can be received and provided along I channel and Q channel signal lines. A complex signal S(t) can then be reconstructed from the I channel and Q channel signal lines through complex signal demodulation. A Fourier transform can be used to obtain the detected signal's spectrum for spectrum analysis. Angular demodulation can be used to recover the information corresponding to original body movement. The complex signal demodulation and angular demodulation techniques used to provide information to determine original body movement are capable of avoiding the null detection point, i.e. the occurrence of periodic nulls in the sensing field, without limitations on frequency tuning or channel selection.

Another one of known drawbacks of radar monitoring of vital signs lies is in that due to its reduced amplitudes, the reflected radar signal can be easily buried in background noise or can be masked by strong interference caused by the external environment, which includes random movements from the subject under monitoring. These unwanted movements are usually called random body movements (RBMs), and the amplitude of their reflected signals are often much stronger than the millimeter-scale breathing and heartbeat motion, which may be masked by this interference.

From U.S. Pat. No. 10,506,981 B2 a vital signs detection system with random body movement cancellation is known. The vital signs detection system includes a radar device, a nonreciprocal network, a first antenna and a second antenna. An output signal from the radar device is delivered to the first antenna via the nonreciprocal network and then transmitted to a first side of a biological subject via the first antenna. A first reflection signal from the first side of the biological subject is received by the first antenna and then delivered to the second antenna via the nonreciprocal network and then transmitted to a second side of the biological subject via the second antenna. A second, final reflection signal from the second side of the biological subject is received by the second antenna and then delivered to the radar device via the nonreciprocal network for vital signs detection with random body movement cancellation. When the biological subject moves randomly, Doppler phase shifts due to body movements in the final reflected signal will be cancelled, while the Doppler phase shifts due to vital signs will be preserved.

However, besides the need of additional hardware, it can be understood that the method only works under ideal random body movement conditions, when the subject is perfectly aligned in between the two antennas.

Further, U.S. Pat. No. 10,966,663 B2 proposes a method and a system for detecting a vital signs of a subject such as a heart rate and/or a respiratory rate of the subject. The method comprises receiving a reflected radio frequency signal from the subject, wherein the reflected radio frequency signal is based on a transmitted signal, which is Doppler-shifted due to mechanical movements corresponding to at least one of the heart rate or the respiratory rate to form the reflected radio frequency signal; dividing a baseband signal based on the received reflected radio frequency signal and the transmitted signal into a sequence of sliding windows, wherein each sliding window represents a time interval of the baseband signal; estimating a vital signs parameter based on the baseband signal in at least one sliding window of the sequence of sliding windows; determining whether the vital signs parameter may be reliably estimated based on the baseband signal in the at least one sliding window of the sequence of sliding windows; and on condition that the vital signs parameter may not be reliably estimated in the at least one sliding window, determining the vital signs parameter of the at least one sliding window based on vital signs parameters estimated in a plurality of sliding windows representing time intervals close to the time interval of the at least one sliding window for which the vital signs parameter is determined.

The use of sliding windows may allow random body movements to be extracted so as to not disturb the determination of vital signs. As a random body movement occurs, the random body movement will only affect the estimation of vital signs in the sliding window(s) in which the random body movement occurs and not affect the entire acquired signal.

However, depending on the processing window length and overlap, even short segments of random body movement may contaminate large segments of vital sign data, and therefore this method has limitations under complex dynamic environments. An approach which involves useful exploitation of these episodes with moderate random body movements, rather than simply discarding segments of data, is desired.

In U.S. Pat. No. 9,924,906 B2, a method and system for cancelling body movement effects for non-contact vital signs detection is described. The method begins with sending on a first electromagnetic wave transceiver a first electromagnetic signal with a first frequency to a first side of a body, such as a person or animal. Simultaneously using a second electromagnetic wave transceiver, a second electromagnetic signal is sent with a second frequency to a second side of a body, wherein the first frequency and the second frequency are different frequencies. A first reflected electromagnetic signal reflected back in response to the first electromagnetic wave on the first transceiver is received and a first baseband complex signal is extracted. Likewise, a second reflected electromagnetic signal reflected back in response to the second electromagnetic wave on the second transceiver is received and a second baseband complex signal is extracted. The first baseband complex signal is mathematically combined with the second baseband complex signal to cancel out a Doppler frequency drift there between to yield a periodic Doppler phase effect.

Again, besides the need of additional hardware, the method will only work under ideal random body movement conditions, when the subject is aligned in between the two antennas.

In the article by J. Muñoz-Ferreras, Z. Peng, R. Gómez-García and C. Li, "*Random Body Movement Mitigation for FMCW-Radar-Based Vital-Sign Monitoring,*" 2016 IEEE Topical Conference on Biomedical Wireless Technologies, Networks, and Sensing Systems (BioWireleSS), 2016, pp. 22-24, doi: 10.1109/BIOWIRELESS.2016.7445551, the employment of two frequency-modulated continuous-wave (FMCW) radars to illuminate two opposite sides of the patient is proposed to deal with the RBM phenomenon. An advanced range-bin alignment technique is utilized to derive the range histories from the two transceivers and proceed with the RBM mitigation. Moreover, since this approach is only based on the signal amplitudes, the FMCW radar sensors do not need to be coherent.

Another direction of research basically tries to identify segments of vital signs data with RBMs, and simply discard these corrupted segments before estimation ([Kim, Jong Deok et al., 2019, *"Non-contact respiration monitoring using impulse radio ultrawideband radar in neonates"*, R. Soc. open sci. 6:190149.190149. http://doi.org/10.1098/rsos. 190149]; [Lee W H, et al., *"Feasibility of non-contact cardiorespiratory monitoring using impulse-radio ultrawideband radar in the neonatal intensive care unit"*, PLoS One, 2020 Dec. 28; 15(12):e0243939. doi: 10.1371/journal.pone.0243939. PMID: 33370375; PMCID: PMC7769476.]; [Adib, F. et al., 2015, *"Smart Homes that Monitor Breathing and Heart Rate"*, Proceedings of the 33rd Annual ACM Conference on Human Factors in Computing Systems (CHI '15). Association for Computing Machinery, New York, NY, USA, 837-846. DOI:https://doi.org/10.1145/2702123.2702200]). However, depending on the length of the processing window and the overlap, even a very short random body movement of one second or less affects several seconds of a well usable signal. Therefore, an approach which involves useful exploitation of these episodes with moderate random body movements, rather than simply discarding segments of data, is desired.

Since spontaneous RBMs are inevitable, solving the above-described issues is key for obtaining reliable vital-signs detection in practical applications. Additionally, in a real home or clinical environment, multiple moving objects (and people) will often be present, generating large-scale motions which may also further interfere with the intended monitoring. Therefore, it is fair to say that RBMs remain one of the main challenges in human vital-signs monitoring using radar systems. Solutions to this problem usually requires more sophisticated architectures and signal-processing techniques that may increase hardware complexity and power consumption. This technical challenge is part of the reasons why vital signs monitoring radar devices have not yet reached the market to this day.

SUMMARY

A lot of effort has already been devoted to mitigation of random body movement (RBM) effects in human vital signs monitoring employing radar systems. Several methods were proposed in literature, and even though specific types of movements could be cancelled out in these solutions, they usually require more complex systems. Most of the existing solutions rely on extra or duplicated hardware, thus suffering from practical limitations such as misalignment, synchronization, size and cost [Q. Lv et al., *"Doppler Vital Signs Detection in the Presence of Large-Scale Random Body Movements"*, in IEEE Transactions on Microwave Theory and Techniques, vol. 66, no. 9, pp. 4261-4270 September 2018, doi: 10.1109/TMTT.2018.2852625]. This has limited the application of these techniques in practical environments. Thus, solutions with a single and simple device that can reliably recover the vital signs information from RBM-masked signals are desired.

It is therefore an object of the invention to provide a system and method with improved capability for mitigating effects of random body movement and interference in vital signs monitoring employing radar systems in medical applications, with an as low as possible additional hardware effort and with as little as possible constraints with regard to a relative positioning of the subject and the radar device.

In one aspect of the present invention, the object is achieved by a radar system for vital signs monitoring such as at least heart rate, breathing or blood oxygen saturation. The proposed radar system comprises at least:
- a single radar transmitter unit that is configured for transmitting radar waves towards at least a part of a subject to be monitored,
- a single radar receiving unit that is configured for receiving radar waves that have been transmitted by the single radar transmitter unit and that have been reflected by at least the part of the subject,
- an analog-to-digital converter unit that is configured for providing complex in-phase and quadrature signals from the reflected and received radar waves,
- a displacement reconstruction unit that is configured for receiving the complex in-phase and quadrature signals from the ADC, and for obtaining a reconstructed displacement signal x(t),
- a random body movement mitigation unit that includes a signal decomposition unit that is configured for executing a time and frequency analysis of the reconstructed displacement signal x(t) for obtaining a time-frequency analysis format, a matrix processing unit that is configured for applying a Non-negative Matrix Factorization operation for decomposing the obtained time-frequency analysis format into time basis components of the time-frequency analysis format and frequency basis components of the time-frequency analysis format, a basis filtering unit that is configured for identifying time basis components indicating the presence of random body movement or external interference out of the obtained time basis components of the time-frequency analysis format, and for eliminating the identified time basis components from the time basis components of the time-frequency analysis format to obtain filtered time basis components of the time-frequency analysis format, and a signal reconstruction unit that is configured for reconstructing a filtered time-frequency analysis format using the filtered time basis components of the time-frequency analysis format,
- a control and estimation unit that is configured for estimating at least one vital signs parameter, wherein the estimation is directly or indirectly based on the filtered time basis components of the time-frequency analysis format, and
- an output unit that is configured for providing an output signal that uniquely indicates the at least one vital signs parameter.

The phrase "configured for", as used in this application, shall in particular be understood as being specifically programmed, laid out, furnished or arranged.

The proposed system provides all the prerequisites for achieving, using a suitable method for its operation, an improved reliable vital signs detection in practical applications of vital signs monitoring employing radar systems in medical applications. The inherent non-negativeness property of the non-negative matrix factorization (NMF) allows for physical interpretation of the decomposed matrices. Basis components of the received radar signal that contain the random body movement (RBM) interference, can effectively be identified and eliminated by filtering, i.e. by identifying time basis components indicating the presence of random body movement or external interference and by eliminating the identified time basis components from the time basis components of the time-frequency analysis format, and by eliminating frequency basis components that are associated with the identified time basis components from the frequency basis components of the time-frequency analysis format, for obtaining the filtered time-frequency analysis format. This can be accomplished independent of the nature of interference, as long as the interfering effect is sparse, i.e. not constant and with a duration that is short in relation to the processing window, and independent of a relative position of the monitored subject with regard to the radar system, and without a need of a more complex system or a duplicated hardware. By that, practical limitations such as misalignment and synchronization can be avoided and costs reduced.

It is contemplated within the scope of the present application that the proposed radar system can be employed, without being limited to, as a medical radar-based vital signs monitoring system to:
- mitigate random body movement components over the received signal,
- mitigate external interference over the received signal,
- enable accurate and robust patient vital signs detection and estimation,
- enable estimation of breathing and heartbeat rates,
- be used as clinical obstructive apnea detector and alarm system using artificial intelligence (AI) methods for pattern recognition,
- serve as an epileptic seizure detector and alarm system using deep learning (AI) methods for pattern recognition,
- serve as a stroke, paralysis and spasticity detector and alarm system using deep learning (AI) methods for pattern recognition,
- be integrated into a clinical patient vital signs monitoring and diagnostic system,
- be used as clinical sleeping monitoring system, and
- be used as clinical or ambulant alarm system for sudden infant death syndrome (SIDS) detection.

In preferred embodiments of the radar system, the RBM mitigation unit further comprises a synthesizer unit. The synthesizer unit is configured for applying a composition step that is an inverse operation with regard to the time and frequency analysis of the reconstructed displacement signal x(t) to obtain a filtered displacement signal $\hat{x}(t)$.

In such embodiments of the radar system, the estimation of the at least one vital signs parameter is indirectly based on the filtered basis components of the time-frequency analysis format. In this way, extended options can be provided for estimating the vital signs parameters.

In preferred embodiments of the radar system, the single radar transmitter unit is configured for providing a continuous radar wave having a single carrier frequency, or is configured for providing a frequency-modulated continuous radar wave or a phase-modulated radar wave, which may have any designed waveform.

With the continuous radar wave having a single carrier frequency, the in-phase and quadrature signals from the reflected and received radar waves can be generated directly from an analog-to-digital converter (ADC) of the single radar receiving unit. In case of a FMCW or PMCW radar system, the in-phase and quadrature signals can be obtained from a specific range bin after matched filtering. In such embodiments of the radar system, the phase modulation due to the vital signs displacement of the monitored subject can readily be provided.

It is another object of the invention to provide a method for mitigating random body movement effects and external interference in vital signs monitoring such as at least heart rate or breathing by employing a radar system that is configured for providing in-phase and quadrature signals from reflected and received radar waves.

The method comprises at least the following steps:

illuminating at least a part of a subject to be monitored with radar waves, receiving radar waves that have been reflected by the subject, demodulating the received radar waves for providing complex in-phase and quadrature signals, recovering a displacement signal x(t) from the provided complex in-phase and quadrature signals, executing a time and frequency analysis of the reconstructed displacement signal x(t) for obtaining a time-frequency analysis format, applying a Non-negative Matrix Factorization operation for decomposing the obtained time-frequency analysis format into time basis components $h_i$ of the time-frequency analysis format and frequency basis components $w_i$ of the time-frequency analysis format, identifying time basis components indicating the presence of random body movement or external interference out of the obtained time basis components of the time-frequency analysis format, eliminating the identified time basis components from the time basis components of the time-frequency analysis format and eliminating associated frequency basis components to obtain filtered bases components of the time-frequency analysis format, reconstructing a filtered time-frequency analysis format using the filtered time basis components of the time-frequency analysis format and the filtered frequency basis components of the time-frequency analysis format, and directly or indirectly based on the filtered basis components of the time-frequency analysis format, estimating at least one vital signs parameter.

With the proposed method an effective filtering of the RBM interference can be provided, which is superior to a simple discarding of RBM-corrupted data segments, as in contrast to conventional methods, the entire signal from reflected and received radar waves can be exploited. This can be accomplished independent of the nature of interference and independent of a relative position of the monitored subject with regard to the radar system, and without a need of a more complex system or a duplicated hardware. By that, practical limitations such as misalignment and synchronization can be avoided and costs reduced. Further advantages that have been described in the context with the radar system in accordance with the present invention apply to the proposed method to the full extent.

In preferred embodiments, the method comprises a further step of applying a composition step that is an inverse operation with regard to the step of time and frequency analysis.

This step is to be carried out after the step of eliminating the identified time basis components from the time basis components and the associated frequency basis components from the basis components of the time-frequency analysis format to obtain a filtered time-frequency analysis format, and prior to the step of estimating at least one vital signs parameter.

In such embodiments of the method, the step of estimating the at least one vital signs parameter is indirectly based on the filtered basis components of the time-frequency analysis format. In this way, extended options can be provided for estimating the vital signs parameters.

Preferably, the step of identifying time basis components indicating the presence of random body movement or external interference includes a step of comparing amplitudes assigned to each of the time basis components against an adaptive amplitude threshold, which considers an average of amplitudes assigned to each of the time basis components. In this way, an effective identification of time basis components indicating the presence of random body movement or external interference can be accomplished for a wide range of amplitudes of random body movements or external interferences.

In preferred embodiments of the method, the step of identifying time basis components indicating the presence of random body movement or external interference includes a step of checking a condition that includes a relation between amplitudes of all other components of a selected time basis and that component of the selected time basis that is suspected to indicate the presence of random body movement or external interference. For instance, the condition may comprise that an absolute value of the component of the selected time basis that is suspected to indicate the presence of random body movement is larger than each absolute value of the amplitudes of all other components of the selected time basis by at least a predefined factor. An alternative condition may comprise that the absolute value of the component of the selected time basis that is suspected to indicate the presence of random body movement is larger than a sum of the absolute values of the amplitudes of all other components of the selected time basis.

It is noted that it is also conceived within the scope of the present invention to employ other conditions, in addition or as substitute, that appear appropriate to the skilled person, for identifying small portions of the signal that are different in amplitude characteristics in comparison to the average amplitude of the signal.

The fulfillment of such a condition or a similar one indicates strength and sparsity of the selected time basis, which can be taken as a strong indication of an occurrence of a random body movement. A reliable and effective identification of time basis components indicating the presence of random body movement or external interference can be accomplished in this way.

Preferably, the step of executing a time and frequency analysis of the reconstructed displacement signal x(t) includes applying at least one out of a Short-Time Fourier Transform, a Gabor Transform, a variant of a Wavelet Transform, a Wigner distribution function, the Gabor-Wigner transform and the Hilbert-Huang transform to the reconstructed displacement signal x(t). In this way, an effective analysis of the reconstructed displacement signal x(t) with regard to time and frequency can be accomplished.

Preferably, the step of recovering the displacement signal x(t) from the provided complex in-phase and quadrature signals comprises applying at least one out of complex-signal demodulation (CSD), arctangent (AD), linear demodulation (LD), differentiate and cross-multiply (DACM) demodulation and extended differentiate and cross-multiply (eDACM) demodulation. By applying at least one of these proven methods, recovering the displacement signal x(t) can readily and effectively be achieved.

In preferred embodiments of the method, the step of applying a Non-negative Matrix Factorization (NMF) operation for decomposing the obtained time-frequency analysis format includes optimizing an objective function that represents a generic similarity between the obtained time-frequency analysis format and a matrix product of at least two matrices comprising approximated values for associated time and frequency basis components, respectively, of the obtained time-frequency analysis format with regard to a predefined metric. In this way, the factorization operation can numerically be solved in an effective manner.

The term "optimizing an objective function" as used in this application, shall particularly be understood as minimizing the function value if the objective function is a cost function, and shall particularly be understood as maximizing the function value if the objective function is the negative of a cost function (e.g. a reward function). If the Euclidean (Frobenius) distance is used as a metric, it allows to use simple gradient descent for minimizing the objective function.

The number of predefined bases for the NMF decomposition is preferably selected to consider the different frequency components that are expected be present in the calculated time-frequency analysis format, including breathing and heart beat frequencies and potential RBM interference.

Different types of NMF can be used, arising from different cost functions (or objective function) for measuring the similarity between the obtained time-frequency analysis format and the matrix product of the at least two matrices. Common metrics include, without being limited to, the Euclidean distance (Frobenius norm), the Kullback-Leibler (KL) divergence and the Itakura-Saito (IS) divergence. In addition, different parameters can be used for the regularization of the at least two matrices. Each combination of cost function and regularization parameter results in a different algorithm for solving the NMF problem.

In yet another aspect of the invention, a software module for controlling an automatic execution of steps of an embodiment of the method disclosed herein is provided.

The method steps to be conducted are converted into a program code of the software module, wherein the program code is implementable in at least one digital memory unit (such as a non-transitory, computer-readable medium) of the radar system for vital signs monitoring and is executable by at least one electronic processor of the radar system for vital signs monitoring.

The software module can enable a robust and reliable execution of the method and can allow for a fast modification of method steps.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description characterizes and specifies the invention in particular in connection with the figures.

BRIEF DESCRIPTION OF THE DRAWINGS

Further details and advantages of the present invention will be apparent from the following detailed description of not limiting embodiments with reference to the attached drawing, wherein.

In the different figures, the same parts are always provided with the same reference symbols or numerals, respectively. Thus, they are usually only described once.

DETAILED DESCRIPTION

Figure 1:
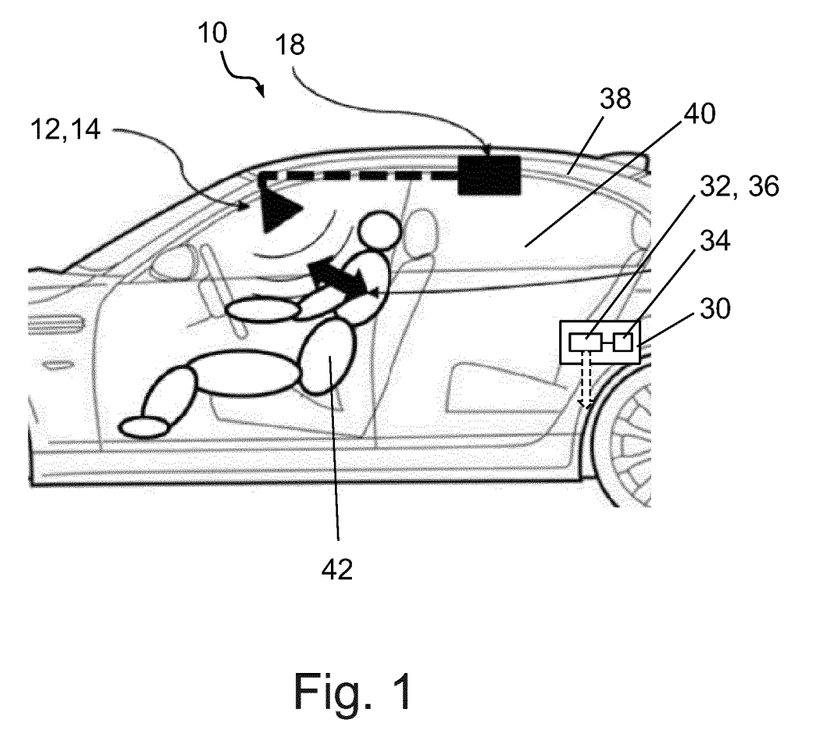
FIG. 1 schematically illustrates a radar system in accordance with the invention for vital signs monitoring such as at least heart rate or breathing in an interior of a vehicle in a side view, installed in the vehicle.

FIG. 1 schematically illustrates, in a side view, a possible embodiment of a radar system 10 in accordance with the invention. In general, the radar system 10 is intended for use in medical applications. In this particular embodiment, the invention is used in an automotive application for medically supporting an automotive in-cabin driver or occupant monitoring system with regard to breathing and heartbeat monitoring.

The radar system 10 is installed in an interior 40 of a vehicle 38, which can be designed as a sedan-type passenger car. In general, the radar system 10 is applicable to any type of vehicle for passenger or animal transportation. The radar system 10 is configured for operation in the interior 40 of the vehicle 38, and particularly for determining range and velocity information from radar waves reflected by a scene given by an interior 40 of the vehicle 38, for vital signs monitoring such as at least heart rate or breathing.

The radar system 10 comprises a single radar transmitter unit 12, a single radar receiving unit 14, an analog-to-digital converter (ADC) unit 15, a displacement reconstruction unit 16 (FIG. 2), a random body movement (RBM) mitigation unit 18, a control and estimation unit 30 and an output unit 32.

The single radar transmitter unit 12 is configured for transmitting radar waves towards a subject 42 to be monitored, for instance towards a chest area. In this particular embodiment, the single radar transmitter unit 12 is configured for providing a frequency-modulated continuous wave (FMCW) radar wave, as is well known in the art.

The single radar receiving unit 14 is configured for receiving radar waves that have been transmitted by the single radar transmitter 12 unit and that have been reflected by the subject 42.

The single radar transmitter unit 12 and the single radar receiving unit 14 are co-located in a monostatic arrangement (FIG. 1). In this particular embodiment, the single radar transmitter unit 12 and the single radar receiving unit 14 form an integral part of a transceiver unit. In other embodiments, the single radar transmitter unit 12 and the single radar receiving unit 14 may be designed as separate units.

The ADC unit 15 is configured for providing in-phase and quadrature signals from the reflected and received radar waves. The displacement reconstruction unit 16 (FIG. 2) is configured for receiving the complex in-phase and quadrature signals from the ADC and for obtaining a reconstructed displacement signal x(t). In this particular embodiment, the displacement reconstruction unit 16 is configured for applying a complex-signal demodulation (CSD) for obtaining the reconstructed displacement signal x(t). In other embodiments, depending on the radar frequency other techniques such as arctangent (AD), linear demodulation (LD), differentiate and cross-multiply (DACM) demodulation and extended differentiate and cross-multiply (eDACM) demodulation can be employed.

Figure 2:
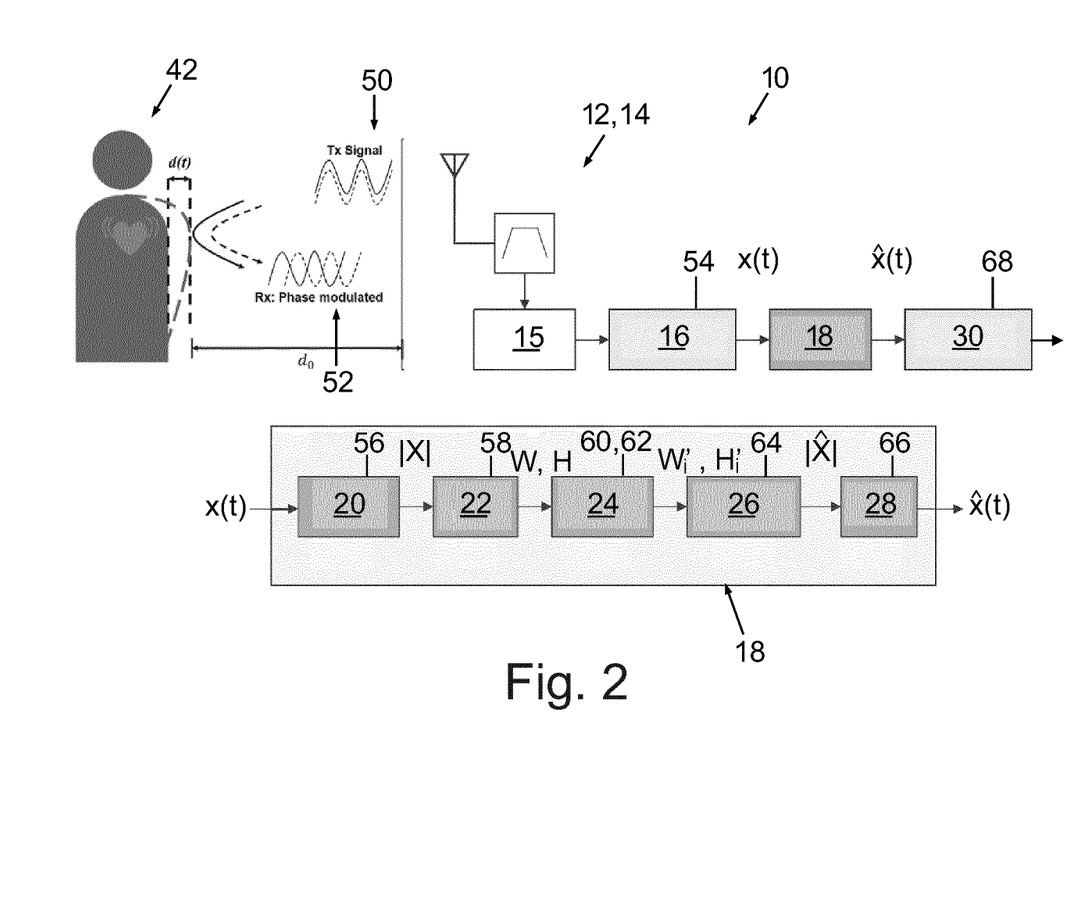
FIG. 2 is an overview block diagram of an embodiment of the radar system and a method in accordance with the invention of operating the radar system pursuant to FIG. 1 for vital signs monitoring.

The RBM mitigation unit 18 includes a signal decomposition unit 20, a matrix processing unit 22, a basis filtering unit 24, a signal reconstruction unit 26 and a synthesizer unit 28, which are understood to be operatively connected in series by appropriate signal lines and data lines.

The signal decomposition unit 20 is configured for executing a time and frequency analysis of the reconstructed displacement signal x(t) for obtaining a time-frequency analysis format. In this particular embodiment, the signal decomposition unit 20 is configured for applying a Short-Time Fourier Transform (STFT) to the reconstructed displacement signal x(t). As a result, the time-frequency analysis format is given by a spectrogram |X|.

The spectrogram |X| of the demodulated displacement signal x(t) is obtained through the application of the STFT to x(t), wherein a suitable weighting window should be used. As will be described later, for being able to identify sparse and mainly short-time RBMs, small STFT weighting windows should be used.

The matrix processing unit 22 is configured for applying a Non-negative Matrix Factorization (NMF) operation for decomposing the obtained spectrogram |X| into time basis components $h_i$ of the spectrogram |X| and frequency basis components $w_i$ of the spectrogram |X|. The NMF operation decomposes the non-negative spectrogram |X| into matrices W and H, containing the associated time $h_i$ and frequency basis components $w_i$ of the non-negative spectrogram |X|, respectively.

The NMF will decompose the non-negative spectrogram |X| as $$|X| \approx WH = \sum_{i=1}^{K}(w_i h_i^T)$$

The matrices H and W contain the associated time $h_i$ and frequency basis components $w_i$ of the non-negative spectrogram |X|, respectively, with K being a predefined number of basis. In other words, W can be seen as a set of frequency templates of the non-negative spectrogram |X|, while H contains the timing information related to the activation of each one of these templates.

The factorization can be achieved through an optimization problem given by $$\min_{W,H} \mathcal{L}(X, WH) \text{ subject to } W \geq 0, H \geq 0$$

wherein the objective function $\mathcal{L}(X,WH)$ represents a generic similarity metric between the non-negative spectrogram |X| and the matrix product WH. In this particular embodiment, the matrix processing unit 22 is configured for applying the Euclidean (Frobenius) distance as a metric. In so doing, simple gradient descent can be employed for minimizing the objective function $\mathcal{L}(X,WH)$. The number K of predefined bases for the NMF decomposition is selected to consider the different frequency components that are expected be present in the non-negative spectrogram |X|, including breathing and heart beat frequencies and potential RBM interference. In other embodiments, another metric, such as the Kullback-Leibler (KL) divergence, the Itakura-Saito (IS) divergence, or any other metric that appears suitable to the skilled person can be employed.

The basis filtering unit 24 is configured for identifying time basis components $h_i$ indicating the presence of random body movement or external interference out of the obtained time basis components $h_i$ of the spectrogram |X|, and for eliminating the identified time basis components $h_i$ and associated frequency basis components $w_i$ from the basis components of the spectrogram |X| to obtain filtered time and filtered frequency basis components $h_i',w_i'$ of the spectrogram |X|.

In this particular embodiment, the identification of the time basis components $h_i$ that contain the random body movements is based on an adaptive amplitude threshold, which considers an average of amplitudes assigned to each of the time basis components $h_i$ in matrix H. Additionally, sparsity of the time basis component $h_i$ is verified based on a condition comprising that an amplitude of all the other components of the selected basis is negligible, i.e. smaller by at least a predefined factor. The magnitude of a filtered spectrogram $|\hat{X}|$ in which time basis component $h_i$ indicating the presence of random body movement or external interference are eliminated, can be reconstructed as $$|\hat{X}| = \sum_{i=1}^{K}(s_i w_i h_i^T)$$

wherein $s_i$ belongs to a selection vector s, which indicates if the time basis $h_i$ contains random body movement effects or not by a vector component value of $s_i=0$ when a random body movement effect is present in time basis $h_i$, and a vector component value of $s_i=1$ elsewise.

The signal reconstruction unit 26 is configured for reconstructing the filtered spectrogram $|\hat{X}|$ using the filtered time basis components $h_i'$ of the spectrogram |X| and the filtered frequency basis components $w_i'$ of the spectrogram |X|.

The synthesizer unit 28 is configured for applying a composition step, which is an inverse operation with regard to the time and frequency analysis of the reconstructed displacement signal x(t), to obtain a filtered displacement signal $\hat{x}(t)$. As in this particular embodiment the time and frequency analysis of the reconstructed displacement signal x(t) is carried out by applying a Short-Time Fourier Transform (STFT), the appropriate inverse operation is selected to be the Inverse Short-Time Fourier Transform (Inverse STFT).

The control and estimation unit 30 comprises a processor unit 34 and a digital data memory unit 36 to which the processor unit 34 has data access (FIG. 1). The control and estimation unit 30 is operatively connected by data links and signal lines to the single radar transmitter unit 12 and may be positioned in the vehicle 38 remote from the single radar transmitter unit 12 and the single radar receiving unit 14. Further, the control and estimation unit 30 is operatively connected by data links and signal lines to output lines of the RBM mitigation unit 18 (FIG. 2).

As will be described in more detail in the following, the control and estimation unit 30 is configured for estimating vital signs parameters, wherein the estimation is indirectly based on the filtered spectrogram $|\hat{X}|$.

The output unit 32 (FIG. 1) forms an integral part of the control and estimation unit 30. The output unit 32 is configured for providing output signals that uniquely indicate the vital signs parameters that have been estimated by the control and estimation unit 30.

In the following, an embodiment of the method in accordance with the invention for mitigating random body movements and external interference effects in vital signs monitoring such as heart rate or breathing by employing the radar system 10 pursuant to FIG. 1 will be described with reference to FIGS. 1 and 2 in general. In preparation of operating the radar system 10, it shall be understood that all involved units and devices are in an operational state and configured as illustrated in FIG. 1.

In order to be able to automatically execute the method, a software module is provided. The method steps to be conducted are converted into a program code of the software module. Several components of the radar system 10 include a processor unit and a digital data memory unit to which the respective processor unit has data access. Parts of the program codes are implemented in the digital data memory units of these components of the radar system 10 and are executable by the processor units of these components of the radar system 10.

With reference to FIGS. 1 and 2, in a first step 50 of the method, by control of the control and estimation unit 30, the single radar transmitter unit 12 is activated for illuminating the subject 42 to be monitored with radar waves.

In a next step 52, radar waves that have been transmitted by the single radar transmitter unit 12 and that have been reflected by the subject 42 are received by the single radar receiving unit 14.

Figure 3:
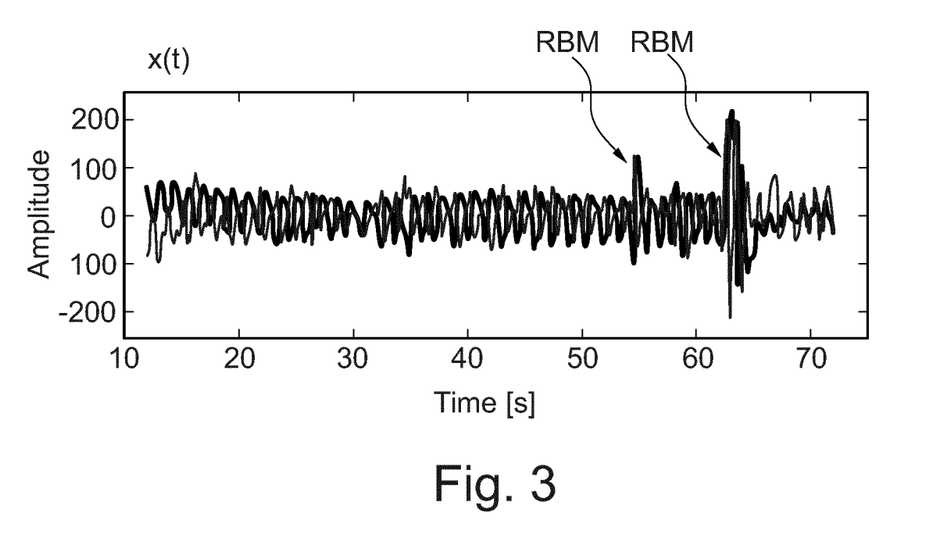
FIG. 3 shows in-phase and quadrature signals of the displacement signal x(t) derived from reflected and received radar waves and being corrupted by random body movement effects.

As described before, the ADC unit 15 provides in-phase and quadrature signals from the reflected and received radar waves and the displacement reconstruction unit 16 recovers the provided complex in-phase and quadrature signals for obtaining a reconstructed displacement signal x(t) by applying a complex-signal demodulation (CSD) in another step 54. FIG. 3 shows a 60 seconds processing window, wherein the reconstructed displacement signal x(t) after CSD is corrupted by small segments of random body movement effects, or any other external interference with similar characteristic.

Figure 4:
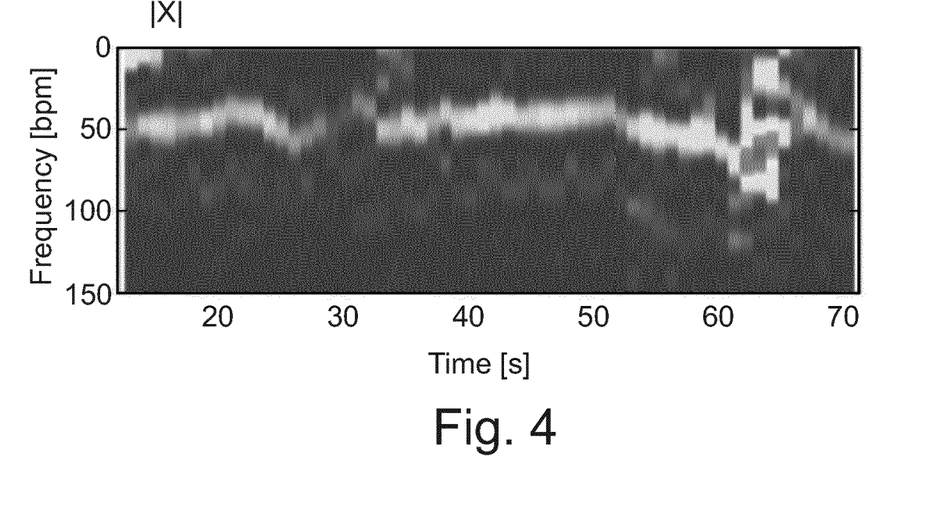
FIG. 4 shows a spectrogram |X| obtained by executing a time and frequency analysis of the reconstructed displacement signal x(t) pursuant to FIG. 3.

In a further step 56, the signal decomposition unit 20 executes a Short-Time Fourier Transform (STFT) on the reconstructed displacement signal x(t) for obtaining a spectrogram $|X|$. In the spectrogram $|X|$ shown in FIG. 4, interference frequencies clearly dominate the spectrum and may compromise a proper estimation of vital signs.

Figure 5:
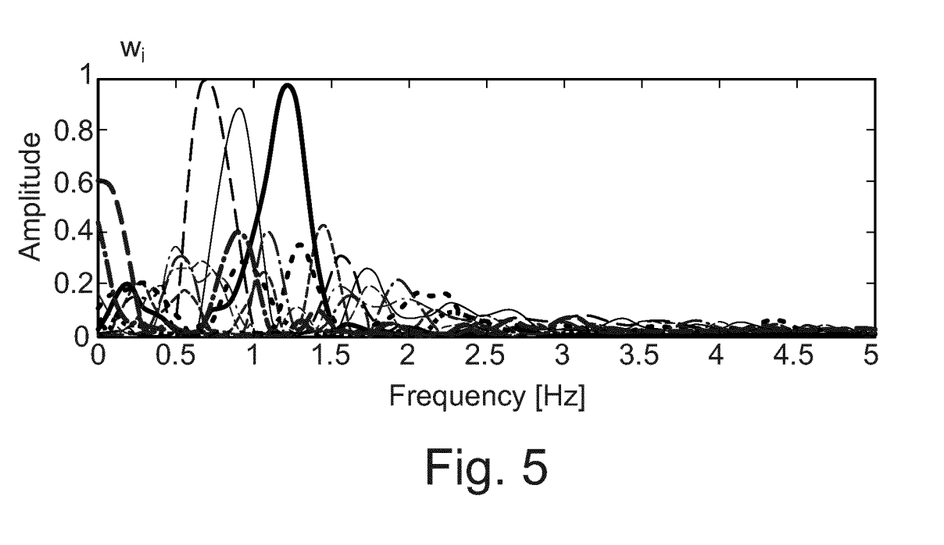
FIG. 5 shows frequency basis components of the spectrogram |X| pursuant to FIG. 4 after applying a Non-negative Matrix Factorization (NMF) operation.
Figure 6:
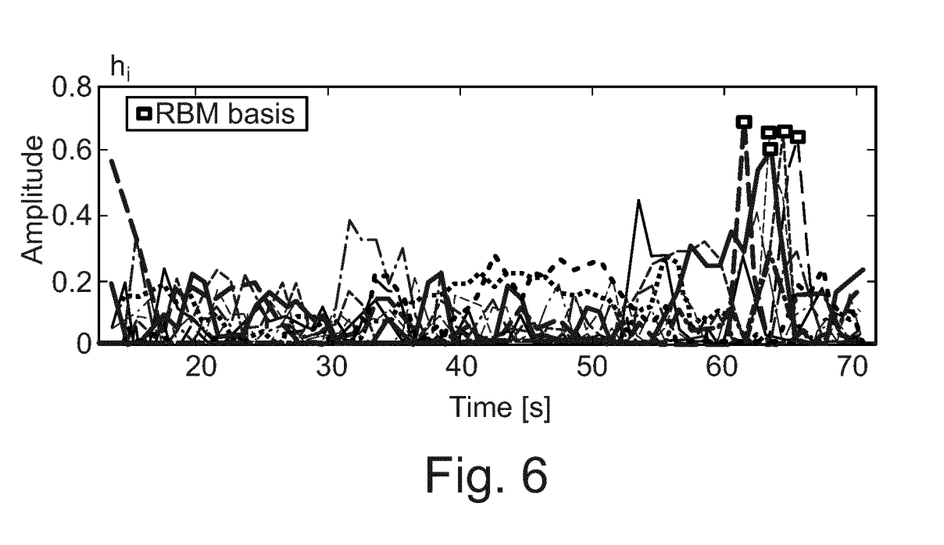
FIG. 6 shows time basis components of the spectrogram |X| pursuant to FIG. 4 after applying the Non-negative Matrix Factorization (NMF) operation.

Then, in a next step 58 of the method, the matrix processing unit 22 applies a Non-negative Matrix Factorization (NMF) operation in the earlier described manner for decomposing the spectrogram $|X|$ into time basis components $h_i$ of the spectrogram $|X|$ and frequency basis components $w_i$ of the spectrogram $|X|$. The NMF operation output into the frequency components (matrix W) and time components (matrix H) is depicted in FIG. 5 and FIG. 6, respectively. While a plurality of frequencies is visualized in W (FIG. 5), the sparse and strong time basis $h_i$, associated to the RBMs, can be identified in H (FIG. 6).

Different types of NMF can be applied, arising from different cost or objective functions for measuring the similarity between $|X|$ and WH. Besides the Euclidean distance (Frobenius norm), common metrics include the Kullback-Leibler (KL) divergence and the Itakura-Saito (IS) divergence. In addition, different parameters can be used for the regularization of the matrices W and H. Each combination of cost or objective function and regularization parameters result in a different algorithm for solving the NMF problem.

In further steps 60, 62, the basis filtering unit 24 identifies the time basis components $h_i$ that indicate the random body movement effects out of the obtained time basis components $h_i$ of the spectrogram $|X|$, using the above-described adaptive amplitude threshold technique and sparsity verification condition, and eliminates the identified time basis components $h_i$ to obtain filtered time basis components $h_i'$ of the spectrogram $|X|$. Removing the identified and selected time bases $h_i$ containing RBM effects (marked with squares in FIG. 6) allows reconstruction of a filtered spectrogram $|\hat{X}|$.

Figure 7:
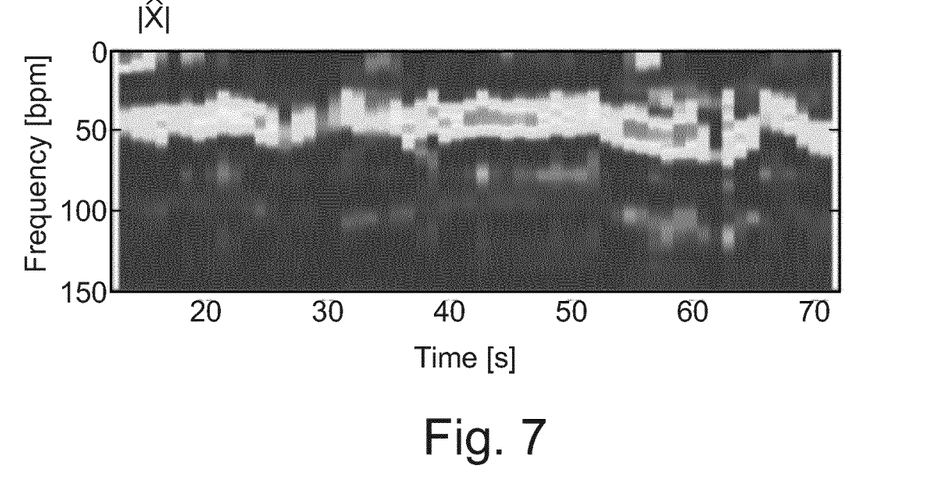
FIG. 7 shows a reconstructed, filtered spectrogram |$\hat{X}$| obtained from the filtered time basis and the filtered frequency basis components of the spectrogram |X|.

In a further step 64, the signal reconstruction unit 26 reconstructs a filtered spectrogram $|\hat{X}|$ using the filtered time basis components $h_i'$ of the spectrogram $|X|$ and the filtered frequency basis components $w_i'$ of the spectrogram $|X|$. This is shown in FIG. 7, in which the vital signs frequency variation with time now becomes evident as a horizontal line at about 45 bpm.

Figure 8:
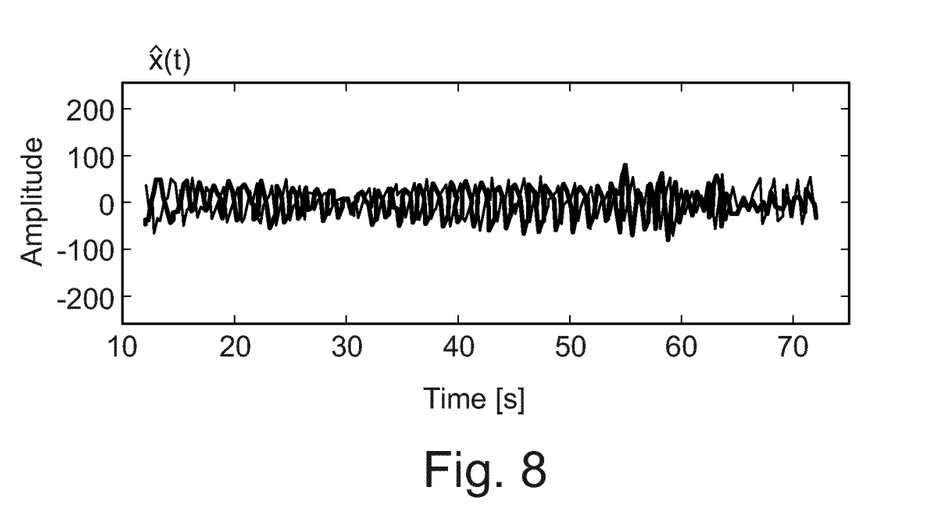
FIG. 8 shows in-phase and quadrature signals of the filtered displacement signal $\hat{x}$(t)

In a step 66 of composition, the synthesizer unit 28 executes an Inverse Short-Time Fourier Transform (Inverse STFT) to obtain a filtered displacement signal $\hat{x}(t)$ as shown in FIG. 8 (in-phase and quadrature signal). The Inverse STFT is thus applied according to $\hat{X}=|\hat{X}| \cdot \angle X$, with $\angle X$ denoting the phase information of the filtered spectrogram $|\hat{X}|$, replicating the same window configuration with regard to duration, weights and overlap as in the initial STFT. The phase information can be obtained for example by employing a Wiener-like filtering approach, which translates into reusing the original phase of the mixed spectrogram. However, any other approach for obtaining the phase information can be employed that appears suitable to the skilled person.

In another step 68 of the method, the control and estimation unit 30 estimates vital signs parameters, based on the filtered displacement signal $\hat{x}(t)$, i.e. indirectly based on the filtered bases components of the spectrogram $|X|$.

Figure 9:
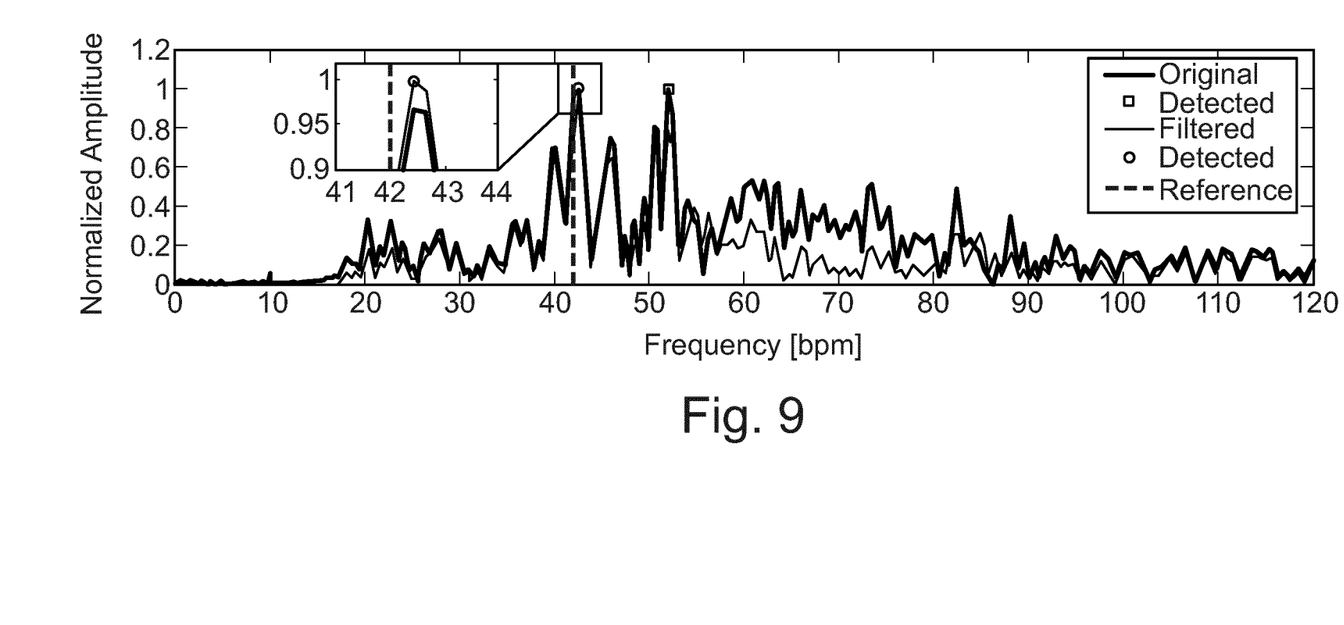
FIG. 9 shows the bandpass spectrum of both the original and the filtered signals.

FIG. 9 shows the bandpass spectrum of both the original signals and the filtered signals, in which the random body movement effect have virtually been eliminated. The corresponding maximum values of these signals are highlighted, respectively, with square markers RBM. The dashed black line shows the 'true' value for the average frequency associated with this processing window. From FIG. 9 it can clearly be taken that due to the strong interference by RBM effects, the maximum value of the original spectrum would indicate an erroneous frequency of 52.1 bpm, which is very distant from the 'true' value of 42 bpm. After RBM filtering in accordance with the method proposed herein, the modified spectrum yields a much closer value of 42.4 bpm, with an error of estimation of only 0.4 bpm. Even short segments of RBM effects may eventually contaminate the entire processing window and jeopardize estimation, which is mainly due to the relevant amplitude differences between RBM induced effects and the desired displacement signal $\hat{x}(t)$.

While the invention has been illustrated and described in detail in the drawings and foregoing description, such illus-

The invention claimed is:

1. A method for mitigating random body movement and external interference effects in vital signs monitoring for at least heart rate and breathing by employing a radar system that is configured for providing in-phase and quadrature signals from reflected and received radar waves, the method comprising at least the following steps:
   illuminating at least a part of a subject to be monitored with radar waves,
   receiving radar waves that have been reflected by the subject,
   demodulating the received radar waves for providing complex in-phase and quadrature signals,
   recovering a displacement signal from the provided complex in-phase and quadrature signals,
   executing a time and frequency analysis of the reconstructed displacement signal for obtaining a time-frequency analysis format,
   applying a Non-negative Matrix Factorization operation for decomposing the obtained time-frequency analysis format into time basis components of the time-frequency analysis format and frequency basis components of the time-frequency analysis format,
   identifying time basis components indicating a presence of random body movement or external interference out of the obtained time basis components of the time-frequency analysis format,
   eliminating the identified time basis components from the time basis components of the time-frequency analysis format and eliminating associated frequency basis components to obtain filtered bases components of the time-frequency analysis format,
   reconstructing a filtered time-frequency analysis format using filtered time basis components of the time-frequency analysis format and filtered frequency basis components of the time-frequency analysis format, and
   directly or indirectly based on the filtered time basis components of the time-frequency analysis format, estimating parameters for the vital signs, wherein the vital skins comprise at least the heart rate and the breathing.

2. The method as claimed in claim 1, further comprising a step of:
   obtaining a filtered displacement signal by applying an inverse operation of the time and frequency analysis of the reconstructed displacement signal,
   wherein the step of obtaining a filtered displacement signal is to be carried out after the step of eliminating the identified time basis components from the time basis components of the time-frequency analysis format to obtain a filtered time-frequency analysis format, and prior to the step of estimating parameters for the vital signs.

3. The method as claimed in claim 1, wherein the step of identifying time basis components indicating the presence of random body movement or external interference includes a step of comparing amplitudes assigned to each of the time basis components against an adaptive amplitude threshold, wherein the adaptive amplitude threshold is based on an average of the amplitudes assigned to each of the time basis components.

4. The method as claimed in claim 1, wherein the step of identifying time basis components indicating the presence of random body movement or external interference includes comparing amplitudes of all other me basis components of a selected time basis and a time basis component of the selected time basis that indicates the presence of random body movement or external interference.

5. The method as claimed in claim 1, wherein the step of executing a time and frequency analysis of the reconstructed displacement signal includes applying at least one out of a Short-Time Fourier Transform, a Gabor Transform, a variant of a Wavelet Transform, a Wigner distribution function, a Gabor-Wigner transform and a Hilbert-Huang transform to the reconstructed displacement signal.

6. The method as claimed in claim 1, wherein the step of recovering the displacement signal from the provided complex in-phase and quadrature signals comprises applying at least one out of complex-signal demodulation (CSD), arctangent demodulation (AD), linear demodulation (LD), differentiate and cross-multiply (DACM) demodulation and extended differentiate and cross-multiply (eDACM) demodulation.

7. The method as claimed in claim 1, wherein the step of applying the Non-negative Matrix Factorization operation for decomposing the obtained time-frequency analysis format includes optimizing an objective function that represents a generic similarity between the obtained time-frequency analysis format and a matrix product of at least two matrices comprising approximated values for associated time and frequency basis components respectively, of the obtained time-frequency analysis format with regard to a predefined metric.

8. A non-transitory, computer-readable medium having stored thereon software that, upon execution by an electronic processor, carries out the method claimed in claim 1.

9. A non-transitory, computer-readable medium having stored thereon software comprising program code that is executable by at least one electronic processor of the radar system as claimed in claim 1.

10. A radar system for vital signs monitoring that includes heart rate and breathing, the radar system comprising:
    a radar transmitter for transmitting radar waves towards at least a part of a subject to be monitored;
    a radar receiver for receiving radar waves that have been transmitted by the radar transmitter and have been reflected by the subject;
    an analog-to-digital converter (ADC) for providing in-phase and quadrature signals from the received radar waves, the ADC is coupled to the radar receiver;
    an electronic processor for processing program code, the electronic processor is coupled to the ADC; and
    a digital memory unit for storing a software module with program code, wherein the electronic processor, upon execution of the program code, is configured to:
receive the in-phase and quadrature signals from the ADC;
obtain a reconstructed displacement signal;
execute a time and frequency analysis of the reconstructed displacement signal to obtain a time-frequency analysis format;
apply a non-negative matrix factorization operation to decompose the time-frequency analysis format into time basis components and frequency basis components;
identify the time basis components that indicate a presence of random body movement or external interference;
eliminate the identified time basis components and their associated frequency basis components from the time-frequency analysis format to obtain filtered time basis components and filtered frequency basis components;
reconstruct a filtered time-frequency analysis format using the filtered time basis components;
estimate parameters for the vital signs based directly or indirectly on the filtered time basis components, wherein the vital signs comprise at least the heart rate and the breathing; and
provide an output signal that indicates the parameters for the vital signs.

11. The radar system as claimed in claim 10, wherein the electronic processor, upon execution of the program code, is further configured to:
obtain a filtered displacement signal by applying an inverse operation of the time and frequency analysis of the reconstructed displacement signal.

12. The radar system as claimed in claim 10, wherein the radar transmitter provides a continuous radar wave having a single carrier frequency, a frequency-modulated continuous radar wave, or a phase-modulated radar wave.

* * * * *